Nov. 25, 1958     F. M. MURPHY     2,862,179
CIRCUIT IDENTIFIER AND TESTER
Filed Dec. 20, 1954     2 Sheets-Sheet 2
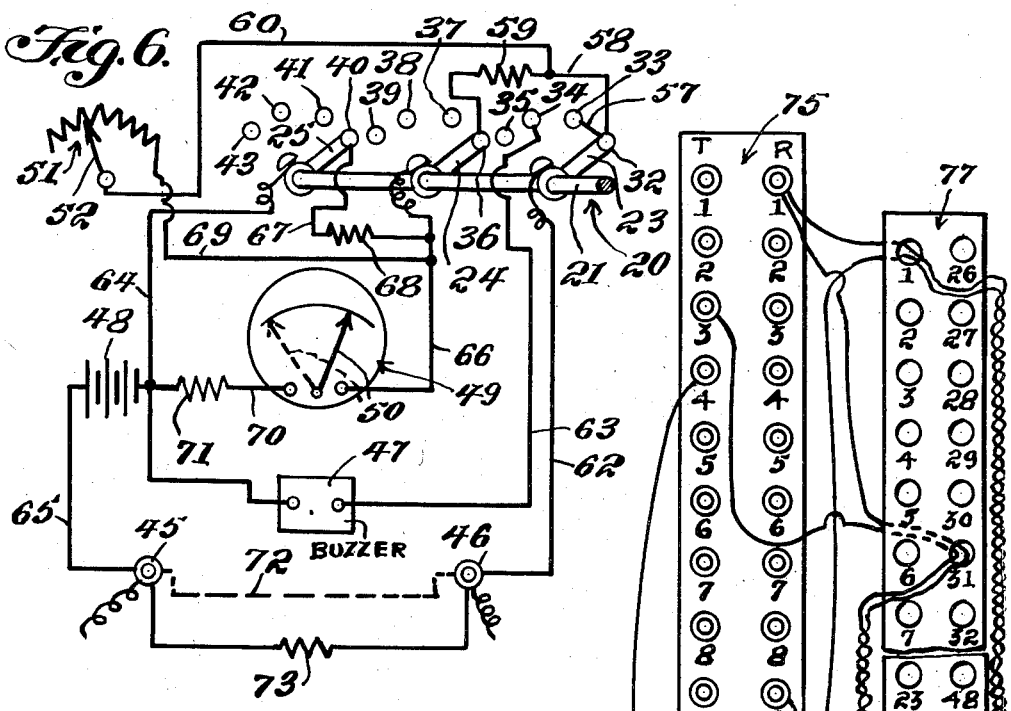
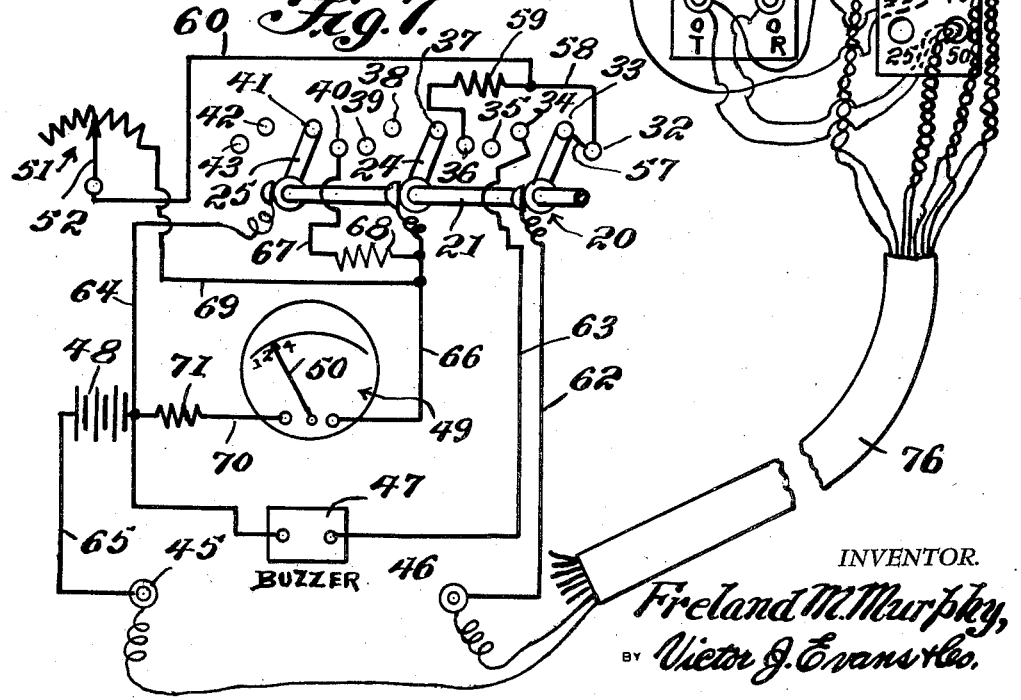
INVENTOR.
Freland M. Murphy,
BY Victor J. Evans & Co.
ATTORNEYS

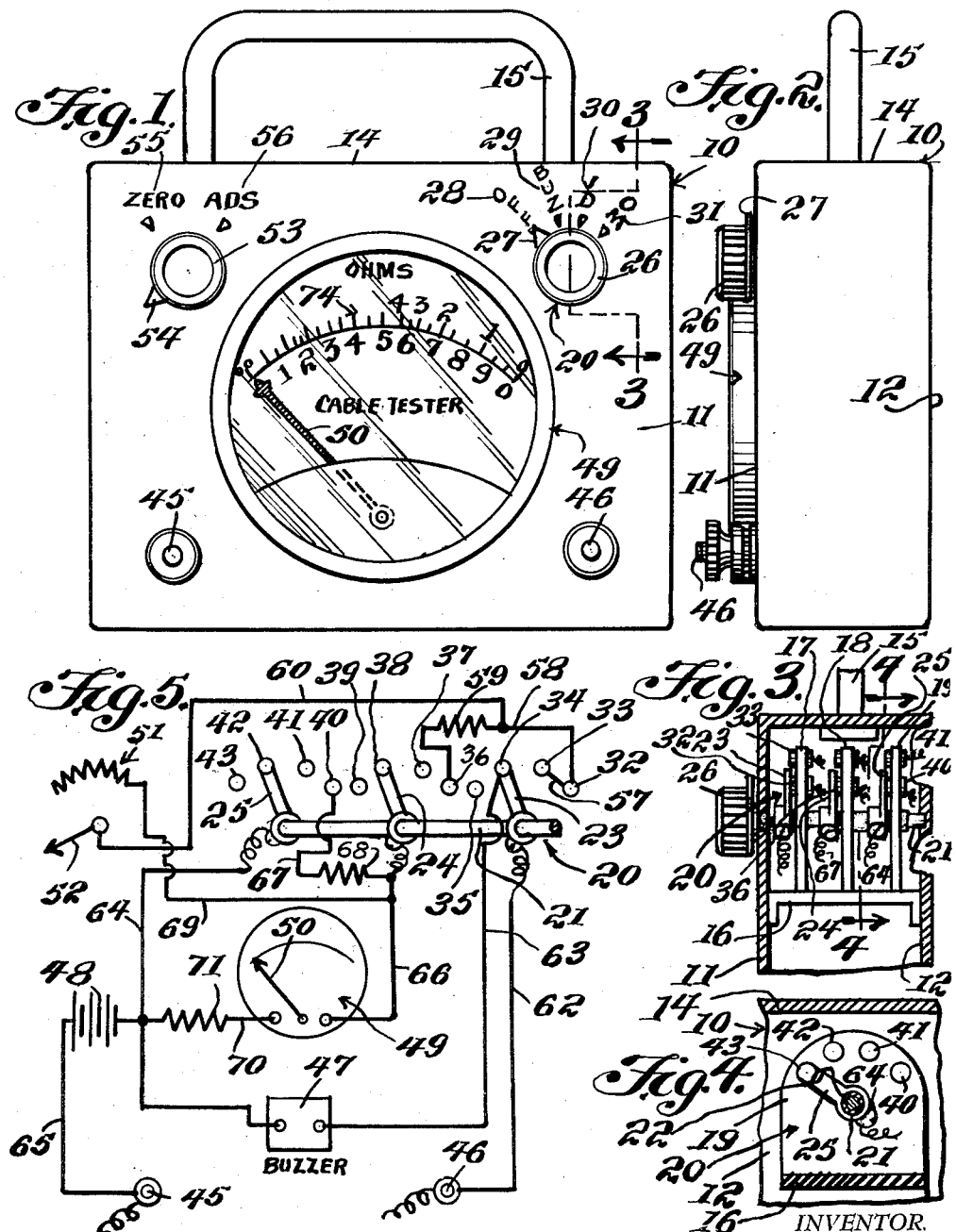

United States Patent Office 2,862,179
Patented Nov. 25, 1958

2,862,179

CIRCUIT IDENTIFIER AND TESTER

Freland M. Murphy, Houston, Tex.

Application December 20, 1954, Serial No. 476,412

3 Claims. (Cl. 324—51)

This invention relates to an electrical instrument, and more particularly to an indicating and testing instrument for electrical circuits.

This invention is an improvement over the circuit identifier and tester shown and described in my co-pending application, Serial No. 409,141, now Patent No. 2,822,519.

The object of the invention is to provide an instrument which combines in one unit a means for testing and indicating a plurality of different circuits.

Another object of the invention is to provide a circuit identifier and tester which includes a buzzer continuity tester and an ohmmeter whereby the instrument can be used for locating troubles in wires so that circuits in short pieces of cable can be identified.

A further object of the invention is to provide a circuit identifier and tester which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the circuit identifier and tester, constructed according to the present invention.

Figure 2 is a side elevational view of the instrument of the present invention.

Figure 3 is a sectional view taken on the line 3—3 of Figure 1.

Figure 4 is a sectional view taken on the line 4—4 of Figure 3.

Figure 5 is a schematic view illustrating the wiring arrangement for the instrument, and showing the buzzer circuit.

Figure 6 is a view similar to Figure 5 but showing an unknown resistor connected across the terminals.

Figure 7 is a view similar to Figures 5 and 6 but showing another use of the instrument for identifying pairs of cables in a circuit.

Referring in detail to the drawings, the numeral 10 designates a hollow housing which can be made of any suitable material, and the housing 10 includes a front wall 11 and a rear wall 12. The housing further includes a top wall 14 that has a handle 15 extending therefrom, Figure 3. Positioned within the housing and secured thereto is a bracket 16 which has a first, second and third panel 17, 18 and 19 secured thereto. These panels are made of electrically insulating material and may be arranged in spaced parallel relation with respect to each other for a purpose to be later described. The present invention further includes a manually operable rotary switching mechanism which is indicated by the numeral 20.

The switching mechanism 20 includes a shaft 21 that has insulation 22 on its outer surface, Figure 4, and extending from the shaft 21 and secured thereto are a first, second and third arm 23, 24 and 25, Figures 3 and 5. The arms 23, 24 and 25 are secured to the shaft 21 so that as the shaft is rotated by means of a knob 26, the arms will likewise be rotated or moved. The knob 26 may carry a pointer 27, Figure 1, and there may be arranged on the outside of the housing indicia for coaction with the pointer 27. Thus, the words or indicia "Off," "Buz," "ID," and "OM" may be arranged on the outer surface of the housing. The numeral 28 designates the word "Off," the numeral 29 points to "Buz," 30 points to "ID," and 31 points to "OM."

Supported by the first panel 17 are four contacts 32, 33, 34, and 35. Supported by the second panel 18 are four contacts which are indicated by the numerals 36, 37, 38, and 39. The other panel 19 also supports four contacts 40, 41, 42 and 43. The numerals 45 and 46 designate a pair of terminals which may be engaged by wires or circuits to be tested.

Arranged within the housing 10 is a buzzer 47 of conventional construction, and also positioned in the housing is a suitable source of E. M. F. such as a battery 48. A suitable meter 49 is positioned in the housing and the meter 49 may include a movable hand or pointer 50. The numeral 51 designates an adjustable resistance which includes a movable element 52 that can be adjusted by means of a knob 53 which is arranged on the outside of the housing, and the knob 53 may carry a pointer 54 which is adapted to be aligned with the word "Zero" or the expression "ADS." The expression "ADS" is indicated by the numeral 56, and the word "Zero" by the numeral 55.

The pair of contacts 32 and 33 may be connected together by a wire or conductor 57, Figures 5, 6 and 7, and a conductor 58 electrically connects the contact 36 to the contact 32, there being a resistance 59 interposed in the conductor 58. A conductor 60 connects the conductor 58 to the adjustable resistance 51. A conductor 62 connects the arm 23 to the terminal 46, and a conductor 63 connects the contact 34 to the buzzer 47, the buzzer 47 being also connected to the arm 25 by means of a conductor 64. A wire or conductor 65 leads from the terminal 45 to the battery 48. A conductor 66 leads from the meter 49 to the arm 24, and a wire 67 connects the conductor 66 to the contact 40, there being a resistance 68 interposed in the wire or line 67. A conductor 69 leads from the wire 66 to the adjustable resistance 51. There is further provided a conductor 70 which serves to electrically connect the battery 48 to the wire 64 and to the meter 49, there being a resistance 71 interposed in the conductor or line 70.

From the foregoing it is apparent that there has been provided a circuit identifier and tester which combines with the tester of my co-pending application, Serial No. 409,141, a buzzer continuity tester and an ohmmeter. Thus there is a combination of three test sets in one and the buzzer continuity circuit as set in Figure 5 is used by the workman for buzzing to identify circuits in short pieces of cable such as terminal tails, and the ohmmeter circuit is used by the workman to get an approximate location of troubles encountered while making the other tests in the cable, such as troubles due to shorts, grounds, and crosses in the conductors. The present invention provides a combination of test circuits, all of which are used by the same workmen in the course of a day's work so that there is provided a convenient and practical tool. By combining three test sets, the workmen need only carry one testing device instead of three separate ones and the change from one type of tester to the other is made by throwing from one position to another the rotary type switch 20 or other convenient switching method so that the circuit which provides the desired type of testing equipment is made available. It is desired to cover in this application the principle of supplying the three types of test circuits in one, regardless of the method by which the change from one circuit to another is to be made. There are only two binding posts 45 and 46 which become the terminal points for each of the three types of testers in turn as the switch is thrown from one type of circuit to another. Thus, in changing from one type of tester to another, it is not necessary for the workman to move the test leads from one set of terminals to another and this makes for easy and convenient shifting to the desired circuit with a minimum loss of time.

The terminal posts are indicated by the numerals 45 and 46 and extend outwardly of the cabinet or housing 10 which encloses the test circuit so that the two test leads can be connected whereby the final connection to the circuit under test is to be made. The battery 48 provides the current necessary to give the readings on the meter for both the circuit identifier tests as well as the ohmmeter tests used in locating troubles and this same battery is also used to provide current for operation of the buzzer 47 when the buzzer is used in the buzzer continuity tester. The rotary switch 20 is used to change the circuit from one type of test circuit to another. The three switch arms 23, 24 and 25 are ganged together and the resistor 51 is an adjustable resistance used for adjusting to zero reading the meter 49 used in the test circuits. The resistor 71 is a series or multiplying resistor which is used to limit the amount of current flowing through the meter so as to reduce the possibility of damage to the meter in the event of a short circuit across the terminals 45 and 46. This resistor thus becomes a part of the ohmmeter circuit when shunted by the resistor 68, as the rotary switch is thrown to ohmmeter position, marked "OM" in the view shown in Figure 1. The resistor 68 is a shunting resistor which is used to give a more desirable or broader reading when the ohmmeter circuit is used, and the resistor 59 is a shunting resistor across the variable resistor 51. By using the shunting resistor 59, it is possible to obtain a fine adjustment of the zero setting of the ohmmeter.

The switch shown in Figure 5 is set for the buzzer continuity circuit to operate. Thus, the pointer 27 registers with the word "Buz" indicated by the numeral 29 in Figure 1 when the parts are in the position shown in Figure 5 so that there results a series circuit consisting of the battery 48 and the buzzer 47 which are connected between the terminal posts 45 and 46. When the posts 45 and 46 are connected together through a common conductor external to the test set itself, the buzzer 47 will buzz to give an audible tone and indicate continuity in the circuit connected between the two binding posts 45 and 46.

When the rotary switch 20 is thrown into position marked "OM" and indicated by the numeral 31 in Figure 1, the parts are in the position shown in Figure 6 so that the series resistor 71 and the meter 49 are shunted by the resistor 68. Likewise, the adjustable resistance 51 is shunted by the resistor 59. In use, the terminals 45 and 46 are connected directly together and the adjustable resistor 51 is adjusted to give a zero reading by means of the knob 53 so that there results a zero reading on the ohmmeter scale of the meter 49. In Figure 6 the short circuit wire is indicated by the numeral 72, and the unknown resistor which is connected across the terminals is indicated by the numeral 73. The short circuit 72 across the terminals is then removed and the unknown resistor 73 is connected across these same terminals. Now, the reading of the ohmmeter 49 will be in proportion to the amount of resistance connected to the terminals 45 and 46 and the ohmmeter scale 74 on the meter 49 is calibrated so as to read directly in ohms, the amount of resistance in the external circuit between the terminals 45 and 46. Thus, the ohmmeter circuit is available to be used by workmen in measuring the resistance to a fault in the insulation of the conductors in the cable. Then, knowing the gauge of conductors with which he is working, the workman can use these figures to determine how far, in feet, it is to the location of the trouble.

The present invention can be used also as a cable pair identification circuit, with the parts arranged as shown in Figure 7 and with the pointer 27 registering with the expression "ID" and marked 30 in Figure 1. Thus, with the rotary switch 20 in position marked "ID" on the circuit housing, the test set now consists of a series circuit which includes terminal posts 45 and 46, battery 48, resistor 71, meter 49, adjustable resistor 51. This is in effect an ohmmeter and is used to identify circuits which have been previously connected to a terminal board 75 as described in my co-pending application, Serial No. 409,141.

Thus, it will be seen that there has been provided a means for permitting one person with a single test set to perform a plurality of operations without the use of a helper. The following operations can be performed: identification of cable pairs, as shown in Figure 7, which is an operation required for properly connecting cables together; buzzer continuity testing as shown in Figure 5 which is to be used in identifying the circuit in a short piece of cable such as cable terminal tails for a later bridging into main or feeder cables. Also, there is an ohmmeter with which the workman may locate shorts, grounds, and crosses as shown in Figure 6 when the shorts or grounds have been encountered while making the other previously listed two tests. The test set is light and small and is the only one needed by a man splicing terminals into a new cable. Furthermore, with the present invention either combinations of two of the above testers may be had in a single test unit where all three test sets are not required. Furthermore, by providing a single test set in which are combined two or three commonly used test sets to form a single test set, it will be easy and convenient for one man to handle on the job. Also, since the test set can be used by only one man, it will reduce the number of man hours required to perform splicing operations on new or non-working cables and the likelihood of damage or breakage to the test sets is reduced since handling is reduced. Also, the test set can be easily changed from one type of testing circuit to another by simply moving the switch knob 26 from one to another of the three or four clearly marked positions as shown in Figure 1. Use of the device can be easily and quickly taught since its operation is simple and very easily demonstrated and it is to be understood that the invention is not to be restricted to the particular or precise circuit demonstrated but rather the present invention is directed to a combination of test sets each of which are to be used in turn or at times by a cable worker in the operation of splicing cable terminals into non-working cables. Thus, the exact circuit will vary from one application to another in order to make it adaptable to the various conditions under which such test set can be used.

The device can be used by a cable splicer in making tests preliminary to bridging cable terminals into non-working cables and troubles can be located and the buzzer continuity test circuit can be used for making continuity tests or identification tests by the buzzer method.

Referring to Figure 7, the numeral 75 designates a terminal board and the numeral 76 designates the cable to be tested and in use the outer ends of the cable 76 are cleared and then the user or other person opens and fans out pairs at the end where the junction splice to the working cable is to be made. The numeral 77 designates a tag board such as the tag board shown in my copending application, and in use without any testing, the pairs are placed in the tag board by layers if possible and the pairs are extended two feet or more past the tag board 77 and then the tips are separated. It is to be noted that the terminal board 75 has two vertical rows of binding posts numbered 1-0, and designated "T" and "R," respectively. The tips of all the pairs will be connected to the left hand or "T" row of binding posts and the rings of all pairs will be connected to the right hand or "R" binding posts in the order listed subsequently. It will be noted that the tip side of each pair will be connected to a lug whose number is the "tens" digit of the pair number and the ring side of each pair will be connected to a lug whose number is the "units" digit of the pair number. Then, connect the tips of all pairs from 01 to 09, as well as any even 100 pair to the "T" lug marked 0. Connect the tips of all pairs from 10 to 19 to the "T" lug marked 1, and connect the tips of all pairs from 20 to 29 to the "T" lug marked "2" and so on through all the pairs until the tip side of every pair has been connected to a "T" lug whose number corresponds to the "tens" digit of the pair number. Now, connect the ring side of every pair whose "units" digit is 1, that is, pairs 1, 11, 21, 31, 41, etc., to the "R" lug marked 1. Connect the ring side of every pair whose "units" digit is 2, that is, pairs 2, 12, 22, 32, etc., to the "R" lug marked 2, and so on through all the ring sides. Connect the tracer pair, regardless of its actual pair number to the "T" and "R" lugs marked 0 and 0, and this is important because this pair is to be used at each location for calibration purposes.

To check the set-up for troubles that will interfere with testing, set the switch to "ID" and connect the two binding posts 45 and 46 to the "T" and "R" lugs marked 0 and 0. With the knob 53, adjust the meter 49 to read full scale or "0" on the meter face. Then, remove the meter unit lead from the "T" lug marked 0 and connect this lead in turn to each of the lugs on the board. The meter, in every case should read a number on the meter face that corresponds to the number alongside the lug to which the meter unit lead is connected. If two lugs bearing different numbers read to the same point on the meter, a cross is indicated between some wire in one lug with a wire in the other lug. This cross must be cleared or the wires removed from the terminal board before the tests can proceed. When every lug yields the proper reading on the meter 49, disconnect the meter unit from the "R" lug marked 0 and carefully wrap the cable end, the tag boards 77, and the terminal board 75 for protection against the weather.

To identify pairs at a cable opening, connect one post of the meter unit to the ring side of the tracer pair and the other post of the meter unit to the tip side of the tracer pair. Then, using the knob 53, adjust the meter reading to "0" and this adjustment compensates for the loop resistance of the cable pair back to the terminal board and is effective up to a loop of approximately 4500 ohms. The same adjustment also compensates for the ageing of the batteries 48. Then, remove the lead from the tip of the tracer pair and use a test pick on the end of this lead to contact the other conductors in the cable. Touch this test pick to the tip side of a pair to be identified and the meter will read the tens digit of the pair number. Then, touch the test pick to the ring side of the pair under test and the meter will now read the units digit. For example, if the tip conductor in 3 above gives a reading of 2 on the meter and the ring conductor gives a reading of 7 then the pair number is 27. Pair 1 will read 01, etc. Even hundreds pairs, as 100, 200, etc., will read 00, as will also the tracer pair. The tracer pair, of course, can be distinguished from the other pair reading the same on the meter by the special coloring of the tracer pair.

The final testing for defects and bridging the new cable to the working cable is as follows. When all the terminals have been bridged into the new cable and the new cable is ready for splicing into the working cable, the pairs of the new cable are already in tag boards 77 and no further testing to identify these pairs is necessary. However, tests for shorts, grounds and crosses in the new cable be made as each pair is removed from the terminal board as follows. Ground one side of the meter unit and either one of the "0" lugs on the terminal board 75. As each wire, and only one at the time, is cut loose from the terminal board lug, test the outer end of the pair with a test pick connected to the other side of the meter unit. If there is a ground or cross or short present, the meter will read to indicate what lug the circuit under test is in contact with and no reading on the meter means a clear conductor.

With the cable tester of the present invention a 3636 pair cable can be connected to one of the terminal boards 75 and tested with the meter unit to identify every pair in the cable since the color code designates the hundreds group and this test set will identify the pairs within each hundred.

To connect cables larger than one hundred pairs to the terminal board, simply group all the conductors that are to be connected to a single lug together with the insulation removed from the ends, and with the ends twisted together for good contact, connect a single conductor to this group and connect this single conductor to the desired lug. Likewise, connect all other groups of wires to the correct lug according to the numerical digit of the pair number. In actual practice the user should never test into the same terminal board with more than one meter unit at a time. If another splicer is to be worked in a separate hundreds group, then a second terminal board must be used so that both splicers can be testing at the same time, if desired and when through testing the binding posts are screwed all the way down to reduce the possibility of a short across the posts which might cause the batteries to run down. The terminal board 75 with the exception of the binding posts, is made of non-conducting material to reduce possibility of causing trouble. When the pointer 27 is in the "Off" position as shown in Figure 1, the batteries will not be needlessly run down.

I claim:

1. In a circuit identifier and tester, a hollow housing including front and rear walls arranged in spaced parallel relation with respect to each other, a shaft rotatably mounted between said pair of walls, a bracket positioned in said housing, a first, second and third panel arranged in spaced parallel relation with respect to each other and positioned in said housing and secured to said bracket, a first, second and third arm secured to said shaft and arranged adjacent to said panels, a first, second, third and fourth contact mounted in each of said panels, a buzzer, meter, and EMF source positioned in said housing, a first and second terminal extending through the front wall of said housing, said arms being mounted for movement into and out of engagement with said contacts, a conductor extending between said first terminal and said first arm, a conductor connecting the first and second contacts of said first panel together, a conductor connecting the third contact on said first panel to said buzzer, a wire connecting the first contact of said first and second panels together and having a resistor therein, an adjustable resistance connected to said wire and to said second arm and to said meter, a conductor connecting the first contact of said third panel to said second arm and having a resistor therein, a conductor connecting said EMF source to said meter and having a resistor therein, and a conductor connecting said third arm to said buzzer.

2. The structure as defined in claim 1, and further including a manually operable knob for rotating said shaft.

3. A circuit identifier and tester, said identifier and tester containing a scale calibrated in the ten numerals from 1 to 9 and zero and adapted to be used with a resistance network built into a terminal board, to properly identify 100 different pairs in a telephone type cable comprising a hollow housing embodying front and rear walls arranged in spaced parallel relation with respect to each other, said housing further including a top wall having a handle extending therefrom, a shaft rotatably mounted between said pair of front and rear walls and having insulation on its outer surface, a bracket positioned in said housing, a first, second and third panel arranged in spaced parallel relation with respect to each other and positioned in said housing and secured to said bracket, said panels being made of electrically insulating material, a first, second and third arm secured to said shaft and arranged adjacent to said panels so that as the shaft is rotated, the arms will likewise be rotated or moved, a first, second, third and fourth contact mounted in each of said panels, a buzzer, meter and EMF source positioned in said housing, a first and second terminal extending through the front wall of said housing, said arms being mounted for movement into and out of engagement with said contacts, a conductor extending between said first terminal and said first arm, a conductor connecting the first and second contacts of said first panel together, a conductor connecting the third contact on said first panel to said buzzer, a wire connecting the first contact of said first and second panels together and having a resistor therein, an adjustable resistance connected to said wire and to said second arm and to said meter, said adjustable resistance including a movable element, a knob arranged exteriorly of said housing for adjusting said movable element, a conductor connecting the first contact of said third panel to said second arm and having a resistor therein, a conductor connecting said EMF source to said meter and having a resistor therein, a conductor connecting said third arm to said buzzer, a manually operable knob for rotating said shaft, and a pointer carried by said knob, there being indicia arranged on the outside of the housing for coaction with said pointer, said indicia including the words "Off," "Buz," "ID," and "OM".

References Cited in the file of this patent

UNITED STATES PATENTS

| | | |
|---|---|---|
| 1,662,548 | Van Deventer | Mar. 13, 1928 |
| 2,558,282 | Triplett | June 26, 1951 |

FOREIGN PATENTS

| | | |
|---|---|---|
| 709,737 | Great Britain | June 2, 1954 |